(12) United States Patent
Okumura (10) Patent No.: US 12,363,496 B2
(45) Date of Patent: Jul. 15, 2025

(54) AUDIO SIGNAL PROCESSING METHOD AND AUDIO SIGNAL PROCESSING APPARATUS

(71) Applicant: YAMAHA CORPORATION, Hamamatsu (JP)

(72) Inventor: Hiraku Okumura, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 373 days.

(21) Appl. No.: 18/172,164

(22) Filed: Feb. 21, 2023

(65) Prior Publication Data

US 2023/0199423 A1  Jun. 22, 2023

Related U.S. Application Data

(63) Continuation of application No. PCT/JP2021/031133, filed on Aug. 25, 2021.

(30) Foreign Application Priority Data

Sep. 9, 2020  (JP) ................................. 2020-151211

(51) Int. Cl.
*H04S 7/00* (2006.01)
*G06F 3/16* (2006.01)
(Continued)

(52) U.S. Cl.
CPC .............. *H04S 7/303* (2013.01); *G06F 3/162* (2013.01); *G10L 15/22* (2013.01); *G10L 21/028* (2013.01);
(Continued)

(58) Field of Classification Search
CPC ...... H04S 7/303; H04S 3/008; H04S 2400/01; H04S 2400/11; G06F 3/162; G10L 15/22; G10L 21/028; G10L 25/51
(Continued)

(56) References Cited

U.S. PATENT DOCUMENTS 8,124,864 B2 *  2/2012  Sato ........................ H04S 5/02
                                                    84/625
8,824,689 B2    9/2014  Disch et al.
(Continued)

FOREIGN PATENT DOCUMENTS

JP    2017184174 A    10/2017
JP    2017200025 A    11/2017
(Continued)

OTHER PUBLICATIONS

International Search Report issued in Intl. Appln. No. PCT/JP2021/031133 mailed Sep. 28, 2021. English translation provided.
(Continued)

*Primary Examiner* — Sean H Nguyen
(74) *Attorney, Agent, or Firm* — ROSSI, KIMMS & McDOWELL LLP (57) ABSTRACT

An audio signal processing method obtains a plurality of audio signals, determines a type of each audio signal of the plurality of audio signals, sets positions of a plurality of virtual speakers, generates, in a case where an audio signal among the plurality of audio signals is determined to be a first type, a first audio signal by performing localization processing on the audio signal determined to be the first type to localize an acoustic image of the first audio signal at a position of any one virtual speaker of the plurality of virtual speakers, generates, in a case where an audio signal among the plurality of audio signals is determined to be a second type, a second audio signal by performing distributed processing on the audio signal determined to be the second type to distribute and localize an acoustic image of the second audio signal at positions of two or more virtual speakers of the plurality of virtual speakers, generates an addition signal by adding the first audio signal and the second audio signal, and outputs the addition signal to a plurality of real speakers.

20 Claims, 10 Drawing Sheets

(51) Int. Cl.
  *G10L 15/22* (2006.01)
  *G10L 21/028* (2013.01)
  *G10L 25/51* (2013.01)
  *H04S 3/00* (2006.01)
(52) U.S. Cl.
  CPC .............. *G10L 25/51* (2013.01); *H04S 3/008* (2013.01); *H04S 2400/01* (2013.01); *H04S 2400/11* (2013.01)
(58) Field of Classification Search
  USPC ........................................................ 381/303
  See application file for complete search history.

(56) References Cited

U.S. PATENT DOCUMENTS

| | | | |
|---|---|---|---|
| 2003/0044002 A1 | 3/2003 | Yeager et al. | |
| 2013/0170679 A1 | 7/2013 | Nystrom et al. | |
| 2013/0251168 A1* | 9/2013 | Takazawa | H04S 7/30 381/86 |
| 2013/0343550 A1* | 12/2013 | Araki | H04S 3/00 381/17 |
| 2014/0133681 A1* | 5/2014 | Mizuta | A63F 13/54 381/300 |
| 2015/0215721 A1 | 7/2015 | Sato et al. | |
| 2019/0335286 A1 | 10/2019 | Suenaga et al. | |

FOREIGN PATENT DOCUMENTS

| | | |
|---|---|---|
| JP | 2018121225 A | 8/2018 |
| WO | 2014034555 A1 | 3/2014 |
| WO | 2017209196 A1 | 12/2017 |

OTHER PUBLICATIONS

Written Opinion issued in Intl. Appln. No. PCT/JP2021/031133 mailed Sep. 28, 2021.

English translation of Written Opinion issued in Intl. Appln. No. PCT/JP2021/031133 mailed on Sep. 28, 2021, previously cited in IDS filed Feb. 21, 2023.

Extended European search report issued in European Appln. No. 21866536.2 mailed on Sep. 11, 2024.

* cited by examiner

AUDIO SIGNAL PROCESSING METHOD AND AUDIO SIGNAL PROCESSING APPARATUS

CROSS REFERENCE TO RELATED APPLICATIONS

The present application is a continuation application of International Patent Application No. PCT/JP2021/031133, filed on Aug. 25, 2021, which claims priority to Japanese Patent Application No. 2020-151211, filed on Sep. 9, 2020. The contents of these applications are incorporated herein by reference in their entirety.

TECHNICAL FIELD

The present disclosure relates to an audio signal processing method and an audio signal processing apparatus that process an audio signal.

BACKGROUND ART

Patent Literature 1 discloses an acoustic signal compensation device including a compensation speaker that outputs a compensation sound in order to compensate for that a sound to be reproduced from a speaker is masked by noise, such as background noise, at a venue such as public viewing.

CITATION LIST

Patent Literature

[Patent Literature 1]: Japanese Unexamined Patent Application Publication No. 2017-200025

SUMMARY

Technical Problem

Placement of a large volume of equipment such as a speaker at a venue improves sound quality and improves a realistic sensation. However, an increase in the volume of equipment requires time and effort of wiring, securing of power sources, securing of manpower, and the like.

In view of the foregoing, the present disclosure is directed to provide an audio signal processing method and an audio signal processing apparatus that are capable of improving a realistic sensation even with less equipment.

Solution to Problem

An audio signal processing method obtains a plurality of audio signals, determines a type of each audio signal of the plurality of audio signals, sets positions of a plurality of virtual speakers, generates, in a case where an audio signal among the plurality of audio signals is determined to be a first type, a first audio signal by performing localization processing on the audio signal determined to be the first type to localize an acoustic image of the first audio signal at a position of any one virtual speaker of the plurality of virtual speakers, generates, in a case where an audio signal among the plurality of audio signals is determined to be a second type, a second audio signal by performing distributed processing on the audio signal determined to be the second type to distribute and localize an acoustic image of the second audio signal at positions of two or more virtual speakers of the plurality of virtual speakers, generates an addition signal by adding the first audio signal and the second audio signal, and outputs the addition signal to a plurality of real speakers.

Advantageous Effects of the Disclosure

A user can improve a realistic sensation even with less equipment.

DESCRIPTION OF EMBODIMENTS

Figure 1:
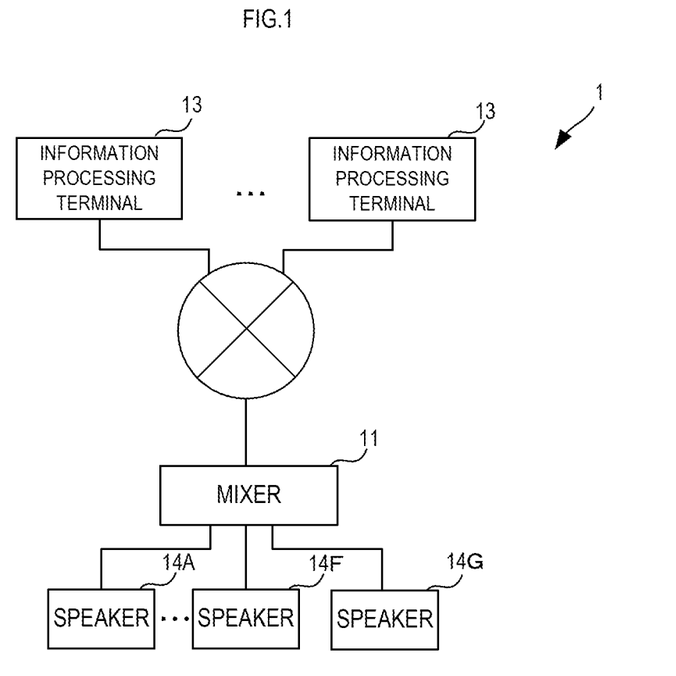
FIG. 1 is a block diagram showing a configuration of an audio signal processing system 1.

FIG. 1 is a block diagram showing a configuration of an audio signal processing system 1. The audio signal processing system 1 includes a mixer 11, a plurality of information processing terminals 13, and a plurality of speakers of a speaker 14A to a speaker 14G.

The mixer 11 and the plurality of information processing terminals 13 are separately installed in different places. The mixer 11 and the plurality of information processing terminals 13 are connected through the Internet.

The mixer 11 is connected to the plurality of speakers 14A to the speaker 14G. The mixer 11 and the plurality of speakers of the speaker 14A to the speaker 14G are connected through a network cable or an audio cable.

The mixer 11 is an example of an audio signal processing apparatus of the present disclosure. The mixer 11 receives an audio signal from the plurality of information processing terminals 13 through the Internet, performs panning processing and effect processing, and supplies the audio signal to the plurality of speakers of the speaker 14A to the speaker 14G.

Figure 2:
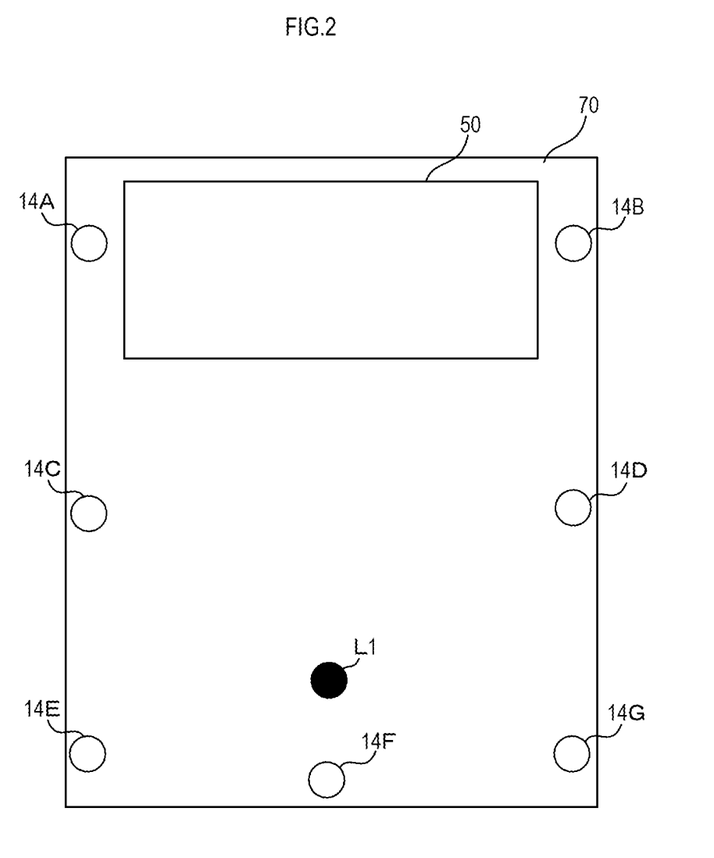
FIG. 2 is a schematic plan view showing an installation mode of a plurality of speakers of a speaker 14A to a speaker 14G.

FIG. 2 is a schematic plan view showing an installation mode of the plurality of speakers of the speaker 14A to the speaker 14G. The plurality of speakers of the speaker 14A to the speaker 14G are installed along a wall surface of a live music club 70. The live music club 70 of this example has a rectangular shape in a plan view. A stage 50 is placed in front of the live music club 70. On the stage 50, a performer performs performance such as singing or playing.

The speaker 14A is installed on the left side of the stage 50, and the speaker 14B is installed on the right side of the stage 50. The speaker 14C is installed on the left side in the front and rear center of the live music club 70, and the speaker 14D is installed on the right side in the front and rear center of the live music club 70. The speaker 14E is installed on the rear left side of the live music club 70, the speaker 14F is installed in the left and right center behind the live music club 70, and the speaker 14G is installed on the rear right side of the live music club 70.

A listener L1 is in front of the speaker 14F. The listener L1 views and listens to the performance of the performer, and performs cheering, clapping, or calling to the performer. The audio signal processing system 1 outputs a sound such as cheering, clapping, or calling of other listeners to inside of the live music club 70 through the speaker 14A to the speaker 14G. The sound such as cheering, clapping, or calling of other listeners is inputted from the information processing terminal 13 into the mixer 11. The information processing terminal 13 is a portable information processing apparatus such as a personal computer (PC), a tablet computer, or a smartphone. A user of the information processing terminal 13 is a listener who remotely views and listens to the performance such as singing or playing in the live music club 70. The information processing terminal 13 obtains a sound, such as cheering, clapping, or calling of each listener, through a not-shown microphone. Alternatively, the information processing terminal 13 may display an icon image, such as "cheer," "clap," "call," and "babble" on a display device (not shown), and may receive a selection operation to these icon images from the listener. The information processing terminal 13, when receiving the selection operation to these icon images, may generate an audio signal corresponding to each icon image, and may obtain the audio signal as a sound such as cheering, clapping, or calling of the listener.

The information processing terminal 13 sends the sound, such as cheering, clapping, or calling of each listener, to the mixer 11 through the Internet. The mixer 11 receives the sound such as cheering, clapping, or calling of each listener. The mixer 11 performs panning processing and effect processing on a received sound, and distributes the audio signal to the plurality of speakers of the speaker 14A to the speaker 14G. As a result, the audio signal processing system 1 is able to send the sound such cheering, clapping, or calling of a large number of listeners, to the live music club 70.

Figure 3:
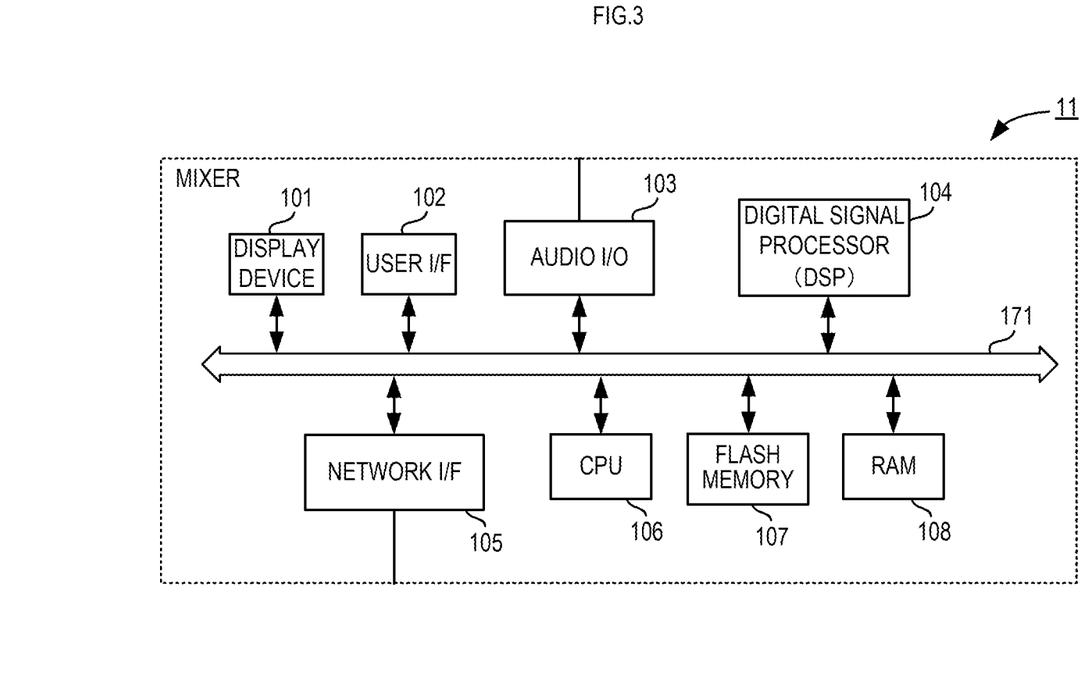
FIG. 3 is a block diagram showing a configuration of a mixer 11.
Figure 4:
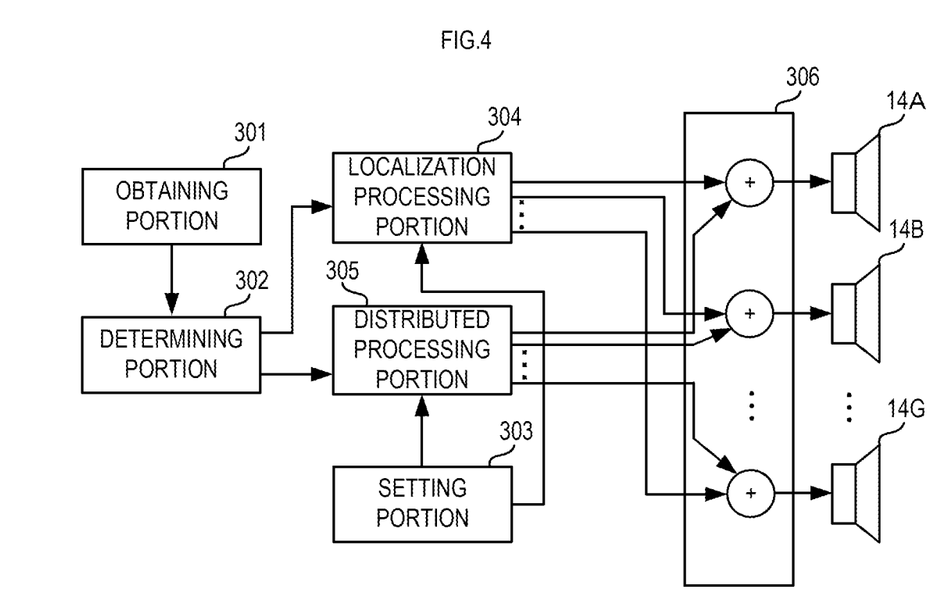
FIG. 4 is a block diagram showing a functional configuration of the mixer 11.
Figure 5:
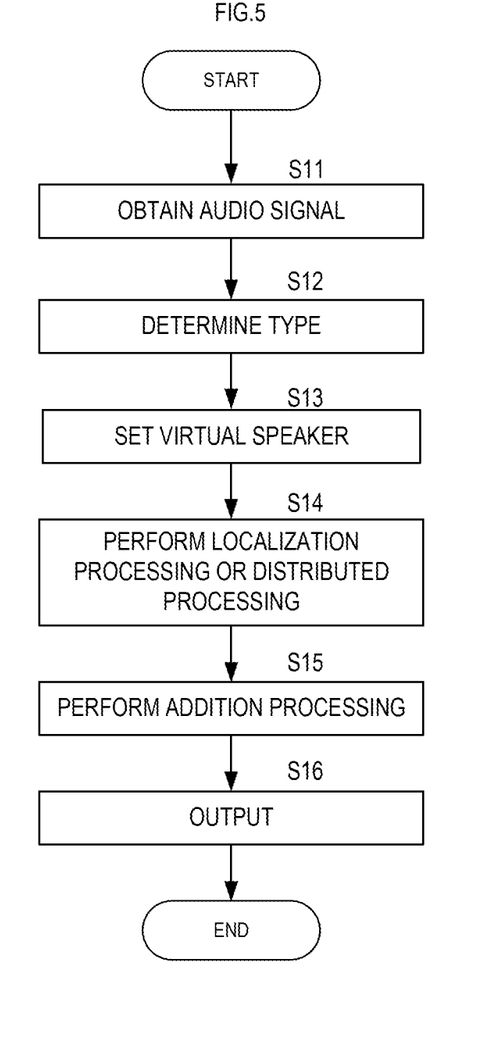
FIG. 5 is a flow chart showing an operation of the mixer 11.

Hereinafter, the configuration and operation of the mixer 11 will be described in detail. FIG. 3 is a block diagram showing a hardware configuration of the mixer 11. FIG. 4 is a block diagram showing a functional configuration of the mixer 11. FIG. 5 is a flow chart showing an operation of the mixer 11.

The mixer 11 includes a display device 101, a user I/F (interface) 102, an audio I/O (Input/Output) 103, a digital signal processor (DSP) 104, a network I/F 105, a CPU 106, a flash memory 107, and a RAM 108. These components are connected to each other through a bus 171.

The CPU 106 is a controller that controls the operation of the mixer 11. The CPU 106 reads and executes a predetermined program stored in the flash memory 107 being a storage medium to the RAM 108 and performs various types of operations.

It is to be noted that the program that the CPU 106 reads does not need to be stored in the flash memory 107 in the own apparatus. For example, the program may be stored in a storage medium of an external apparatus such as a server. In such a case, the CPU 106 may read the program each time from the server to the RAM 108 and may execute the program.

The digital signal processor 104 includes a DSP for performing various types of signal processing. The digital signal processor 104 receives an audio signal according to cheering, clapping, calling, or the like of a listener from the information processing terminal 13 through the network I/F 105.

The digital signal processor 104 performs panning processing and effect processing to a received audio signal. The digital signal processor 104 outputs the audio signal on which the signal processing has been performed, to the speaker 14A to the speaker 14G through the audio I/O 103.

As shown in FIG. 4, the CPU 106 and the digital signal processor 104 functionally include an obtaining portion 301, a determining portion 302, a setting portion 303, a localization processing portion 304, a distributed processing portion 305, and an addition portion 306.

The obtaining portion 301 obtains an audio signal according to cheering, clapping, calling, or the like of a listener from each of a plurality of information processing terminals 13 (S11). Subsequently, the determining portion 302 determines a type of the audio signal (S12).

The type of the audio signal includes a first type or a second type. The first type includes cheering such as "Go for it," calling of a personal name of a performer, or an exclamation such as "Bravo" from each listener. In other words, the first type is a sound that is able to be recognized as a voice of an individual listener without being buried in an audience. The second type is a sound that is unable to be recognized as a voice of an individual listener and is simultaneously emitted by a large number of listeners, and includes clapping, a chorus, a shout such as "Wow," or babble, for example.

The determining portion 302, in a case of recognizing a voice such as "Go for it" or "Bravo" as described above, by voice recognition processing, for example, determines the audio signal as the first type. The determining portion 302 determines the audio signal that does not recognize a voice, as the second type.

The determining portion 302 outputs the audio signal determined as the first type to the localization processing portion 304, and outputs the audio signal determined as the second type to the distributed processing portion 305. The localization processing portion 304 and the distributed processing portion 305 set a plurality of virtual speakers (S13).

Figure 6:
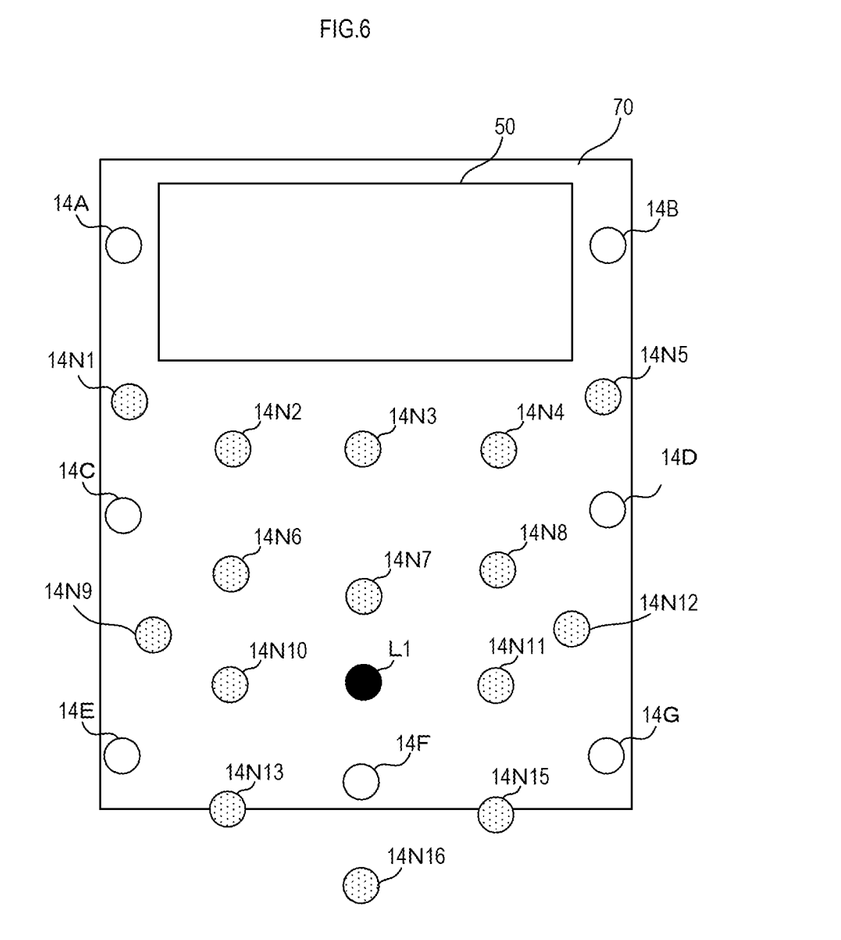
FIG. 6 is a schematic plan view of a live music club 70 showing a virtual speaker.

FIG. 6 is a schematic plan view of a live music club 70 showing a virtual speaker. As shown in FIG. 6, the localization processing portion 304 and the distributed processing portion 305 set the plurality of virtual speakers of a virtual speaker 14N1 to a virtual speaker 14N16. The localization processing portion 304 and the distributed processing portion 305 manage positions of the speaker 14A to the speaker 14G and positions of the virtual speaker 14N1 to the virtual speaker 14N16 in two-dimensional or three-dimensional rectangular coordinates with an origin at a predetermined position (the center of the stage 50, for example) of the live music club. The speaker 14A to the speaker 14G are real speakers. Therefore, the coordinates of the speaker 14A to the speaker 14G are previously stored in the flash memory 107 (or a not-shown server or the like). The localization processing portion 304 and the distributed processing portion 305, as shown in FIG. 6, evenly place the virtual speaker 14N1 to the virtual speaker 14N16 in the entire live music club 70. In addition, in the example of FIG. 6, the localization processing portion 304 and the distributed processing portion 305 set the virtual speaker 14N16 also at a position of the outside of the live music club 70.

It is to be noted that processing to set virtual speakers (S13) does not need to be performed after processing to determine the type of an audio signal (S12). The processing to set virtual speakers (S13) may be previously performed before processing to obtain an audio signal (S11) or the processing to determine the type of an audio signal (S12).

Subsequently, the localization processing portion 304 performs localization processing and generates a first audio signal, and the distributed processing portion 305 performs distributed processing and generates a second audio signal (S14).

The localization processing is processing to localize an acoustic image at any one of the positions of the virtual speaker 14N1 to the virtual speaker 14N16. However, the position at which an acoustic image is localized is not limited to the virtual speaker 14N1 to the virtual speaker 14N16. The localization processing portion 304, in a case in which the position at which an acoustic image is localized in agreement with the position of the speaker 14A to the speaker 14G, outputs an audio signal to any one of the speaker 14A to the speaker 14G.

It is to be noted that, although a localization position of the audio signal of the first type may be set at random, the mixer 11 may include a position information receiving portion that receives position information from a listener. The listener operates the information processing terminal 13 and designates a localization position of an own voice. For example, the information processing terminal 13 displays an image that simulates a plan view, a perspective view, or the like of the live music club 70, and receives the localization position from a user. The information processing terminal 13 sends the position information (coordinates) corresponding to a received localization position to the mixer 11. The localization processing portion 304 of the mixer 11 sets a virtual speaker to coordinates corresponding to the position information received from the information processing terminal 13 and performs processing to localize an acoustic image at a position of a set virtual speaker.

The localization processing portion 304 performs panning processing or effect processing in order to localize an acoustic image at the position of the virtual speaker 14N1 to the virtual speaker 14N16.

The panning processing is processing to localize an acoustic image as a phantom at the position of a virtual speaker by supplying the same audio signal to a plurality of speakers among the speaker 14A to the speaker 14G and controlling the volume of the audio signal. For example, when the same audio signal at the same volume is supplied to the speaker 14A and the speaker 14C, an acoustic image is localized so that a virtual speaker is installed at the center position on a straight line connecting the speaker 14A and the speaker 14C. In other words, the panning processing is processing to increase the volume of an audio signal to be supplied to a speaker adjacent to the position of a virtual speaker and decrease the volume of an audio signal to be supplied to a speaker far from the position of a virtual speaker. It is to be noted that, in FIG. 6, the plurality of virtual speakers of the virtual speaker 14N1 to the virtual speaker 14N16 are set on the same plane. However, the localization processing portion 304 is also able to localize an acoustic image at a virtual speaker at any position on three-dimensional coordinates by supplying the same audio signal to a plurality of speakers installed at different heights.

In addition, the effect processing includes processing to add delay, for example. When delay is added to an audio signal to be supplied to the real speaker 14A to the speaker 14G, a listener perceives an acoustic image at a position farther than the real speaker. Therefore, the localization processing portion 304, by adding delay to an audio signal, is able to localize the acoustic image at the virtual speaker that is set at the position farther than the real speaker 14A to the speaker 14G.

In addition, the effect processing may include processing to add reverb. When reverb is added to an audio signal, a listener perceives an acoustic image at a position farther than the position of a real speaker. Therefore, the localization processing portion 304, by adding reverb to an audio signal, is able to localize the acoustic image at the virtual speaker that is set at the position farther than the real speaker 14A to the speaker 14G.

In addition, the effect processing may include processing to add frequency characteristics by equalizer. The listener perceives an acoustic image not only by a difference in volume and time between both ears but also by a difference in frequency characteristics. Therefore, the localization processing portion 304 is able to localize the acoustic image at the position of the set virtual speaker also by adding frequency characteristics according to transmission characteristics from the position of a target virtual speaker to a target listening position (the center of the stage 50, for example).

In contrast, the distributed processing is processing to distribute and localize an acoustic image at a plurality of the virtual speaker 14N1 to the virtual speaker 14N16. The distributed processing portion 305, in a case in which the position at which the acoustic image is localized is in agreement with the position of the real speaker 14A to the real speaker 14G, outputs an audio signal to any one of the speaker 14A to the speaker 14G.

The distributed processing portion 305 performs panning processing or effect processing in order to localize an acoustic image at the plurality of positions of the virtual speaker 14N1 to the virtual speaker 14N16. The method of localizing each acoustic image at any position of the virtual speaker 14N1 to the virtual speaker 14N16 is the same as the localization processing portion 304. The distributed processing portion 305, by distributing and localizing an acoustic image at the plurality of virtual speakers, reproduces a sound such as a cheer, clapping, a chorus, a shout, or babble.

It is to be noted that the above description shows an example in which reverb is added to localize the acoustic image at the virtual speaker that is set at the position farther than the real speaker 14A to the speaker 14G. However, the reverb is able to allow a listener to perceive spatial expansion of a sound. Therefore, the distributed processing portion 305 may further perform processing to perceive spatial expansion such as reverb, in addition to the processing to localize an acoustic image at the plurality of virtual speakers.

In addition, the distributed processing portion 305 preferably adjusts output timing of an audio signal to be outputted to the speaker 14A to the speaker 14G and shifts arrival timing at which a sound to be outputted from a plurality of real speakers arrives at the listener. As a result, the distributed processing portion 305 is able to further distribute the sound, and is able to provide the spatial expansion.

The addition portion 306 adds the first audio signal on which the localization processing has been performed and the second audio signal on which the distributed processing has been performed, as described above (S15). The addition processing is performed by an addition computing device for each speaker. The addition portion 306 outputs an addition signal obtained by adding the first audio signal and the second audio signal to each of the plurality of real speakers (S16).

Figure 7:
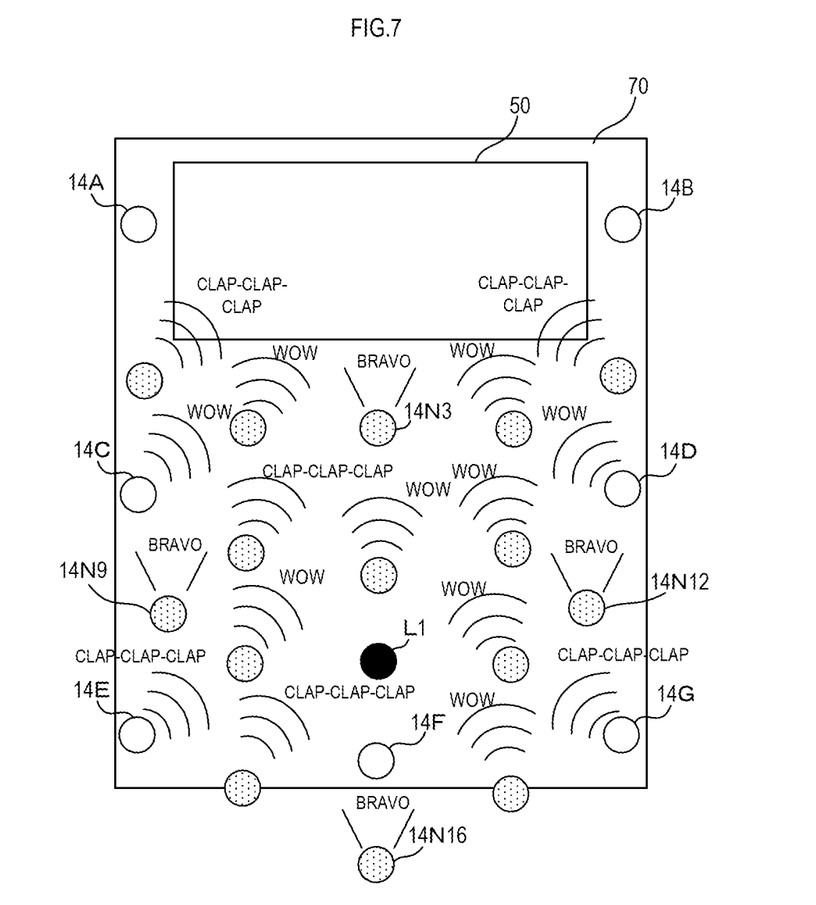
FIG. 7 is a plan view showing a schematic representation of an output mode of a first audio signal and a second audio signal.

As described above, the first audio signal arrives at a listener with any one of the virtual speaker 14N1 to the virtual speaker 14N16 as a sound source. The second audio signal is distributed from the plurality of virtual speaker 14N1 to the virtual speaker 14N16 and arrives at a listener. FIG. 7 is a plan view showing a schematic representation of an output mode of the first audio signal and the second audio signal. As shown in FIG. 7, a voice such as a "Bravo" is outputted from a specific virtual speaker. In the example of FIG. 7, the voice such as "Bravo" is outputted from the virtual speaker 14N3 in the front center of audience seats, the virtual speaker 14N9 and the virtual speaker 14N12 at left and right behind each seat, and the virtual speaker 14N16 at rear outside of the live music club 70. The clapping and the shout such as "Wow" are outputted from the plurality of virtual speakers.

As a result, the performer on the stage 50 can also hear a voice, clapping, a shout, or the like of the listener from a place other than the listener L1, and can perform a live performance under an environment full of realistic sensation. In addition, the listener L1 present in the live music club 70 can also listen to the voice, the clapping, the shout, or the like of the large number of listeners in the same space, and can view and listen to the live performance under the environment full of realistic sensation.

In particular, the audio signal processing method according to the present embodiment is able to emit the voice, the clapping, the shout, or the like of the listener from the larger number of virtual speakers of the virtual speaker 14N1 to the virtual speaker 14N16 than the number of the real speakers of the speaker 14A to the speaker 14G. Therefore, the audio signal processing method according to the present embodiment is able to output the voice, the clapping, the shout, or the like of the listener from various positions even with less equipment, and is able to improve a realistic sensation. In addition, the audio signal processing method according to the present embodiment is able to output the voice, the clapping, the shout, or the like of the listener by setting the position of the virtual speaker to a position outside a space in a real venue to simulate the environment of a larger venue than the real space.

The above embodiment shows an example in which the realistic sensation in the live music club 70 is improved. However, the audio signal processing method according to the present embodiment is also able to improve the realistic sensation of each listener in a remote place in which the information processing terminal 13 is used.

Figure 8:
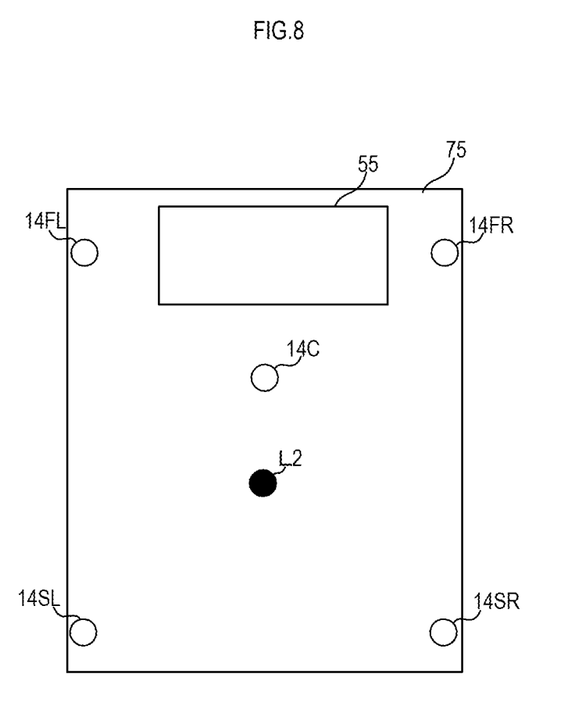
FIG. 8 is a plan view schematically showing an audiovisual environment of each listener who uses an information processing terminal 13.
Figure 9:
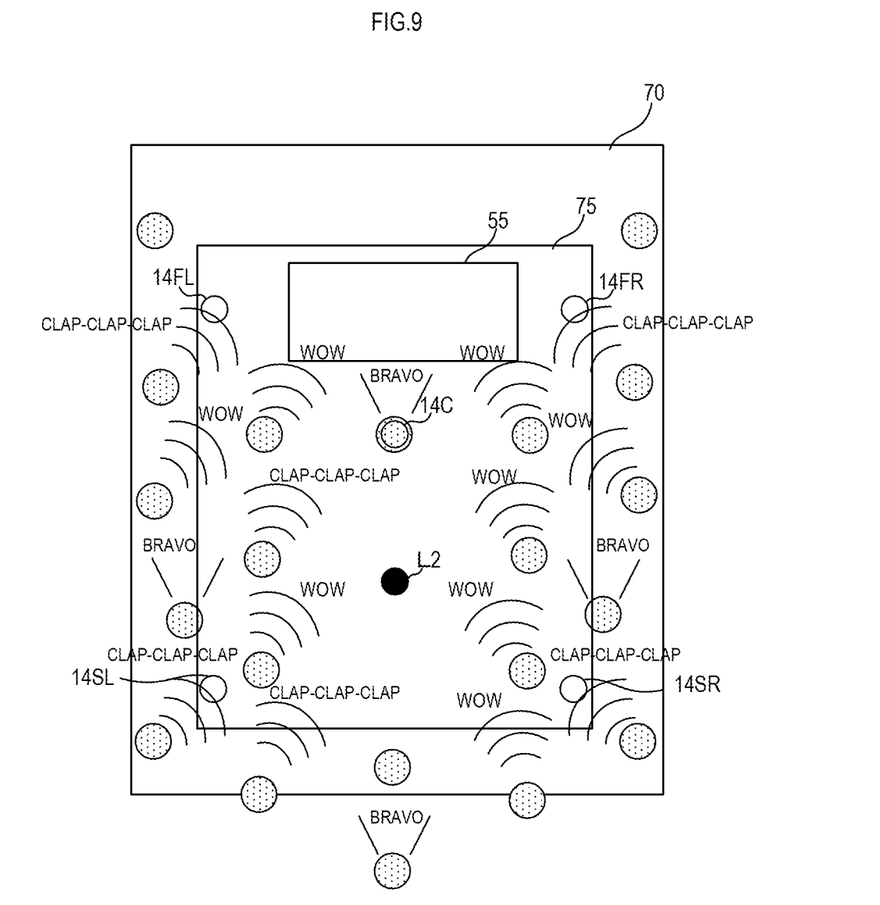
FIG. 9 is a plan view schematically showing an audiovisual environment of each listener who uses the information processing terminal 13.
Figure 10:
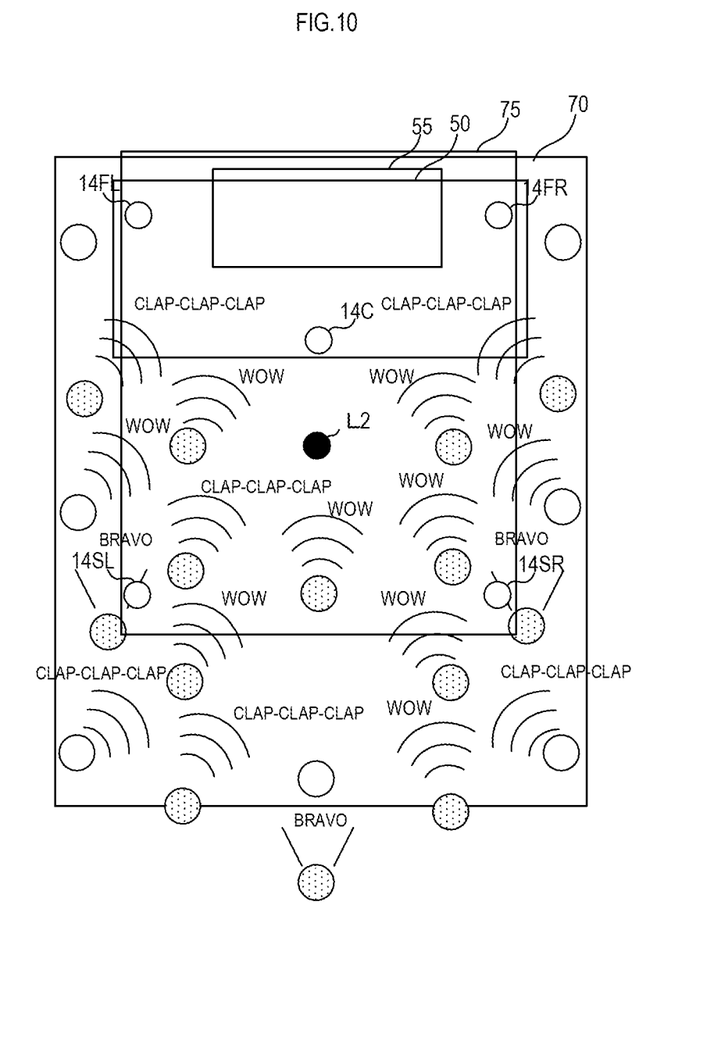
FIG. 10 is a plan view schematically showing an audiovisual environment of each listener who uses the information processing terminal 13.

FIG. 8, FIG. 9, and FIG. 10 are plan views schematically showing an audiovisual environment of each listener who uses the information processing terminal 13. In this example, the speaker 14FL, the speaker 14FR, the speaker 14C, the speaker 14SL, and the speaker 14SR are installed along a wall surface of an indoor room 75. The indoor room 75 of this example has a rectangular shape in a plan view. The display device 55 is placed in front of the indoor room 75. A listener L2 is present in the center of the indoor room. The listener L2 watches performance of a performer displayed on the display device 55.

The speaker 14FL is installed on the left side of the display device 55, the speaker 14C is installed in front of the display device 55, and the speaker 14FR is installed on the right side of the display device 55. The speaker 14SL is installed on the rear left side of the indoor room 75, and the speaker 14SR is installed on the rear right side of the indoor room 75.

The information processing terminal 13 obtains a video and sound according to the performance of a performer. For example, in the example of FIG. 2, the mixer 11 obtains a sound such as a performance sound or a singing sound of a performer and sends to the information processing terminal 13.

The information processing terminal 13, as with the mixer 11, performs signal processing, such as panning processing and effect processing, on an obtained sound, and outputs an audio signal on which the signal processing has been performed, to the speaker 14FL, the speaker 14FR, the speaker 14C, the speaker 14SL, and the speaker 14SR. The speaker 14FL, the speaker 14FR, the speaker 14C, the speaker 14SL, and the speaker 14SR output a sound according to the performance of a performer.

Furthermore, the information processing terminal 13 obtains an audio signal according to cheering, clapping, calling, or the like of other listeners from other information processing terminals 13. The information processing terminal 13, as with the mixer 11, determines the type of an audio signal, and performs localization processing or distributed processing.

As a result, as shown in FIG. 9, the listener L2 can obtain a realistic sensation even in the indoor room 75 as if being in the center of the live music club 70 and viewing and listening to the performance of a performer together with a large audience.

The information processing terminal 13 may include a seat designation receiving portion that receives designation information on a seat position from a listener. In such a case, the information processing terminal 13 changes content of the panning processing and the effect processing based on the designation information on the seat position. For example, when a listener designates a seat position immediately in front of the stage 50, the information processing terminal 13, as shown in FIG. 10, sets the listener L2 at a position immediately in front of the stage 50, sets a plurality of virtual speakers, and performs the localization processing and the distributed processing on an audio signal according to the cheering, the clapping, the calling, or the like of other listeners. As a result, the listener L2 can obtain a realistic sensation as if being present immediately in front of the stage 50.

A provider of the audio signal processing system provides a ticket for a seat position in front of the stage, a seat position beside the stage, a seat position in the center of the live music club, a rear seat position, or the like. The user of the information processing terminal 13 purchases a ticket for any seat position among these seat positions. The user can select a high-priced seat position in front of the stage with a high realistic sensation or can select a low-priced rear seat position, for example. The information processing terminal 13 changes the content of the panning processing and the effect processing according to the seat position selected by the user. As a result, the user can obtain a realistic sensation as if viewing and listening to a performance when being at the seat position purchased by the user. In addition, the provider of the audio signal processing method can conduct business equivalent to a state in which an event is provided in a real space.

Furthermore, in the audio signal processing method according to the present embodiment, a plurality of users may designate the same seat position. For example, each of the plurality of users may designate a seat position immediately in front of the stage 50. In such a case, the information processing terminal 13 of each user provides a realistic sensation such as being at the seat position immediately in front of the stage 50. As a result, the plurality of listeners can view and listen to performance of a performer with the same realistic sensation, with respect to one seat. Therefore, the provider of the audio signal processing method can provide service beyond audience capacity of the real space.

The descriptions of the present embodiments are illustrative in all points and should not be construed to limit the present disclosure. The scope of the present disclosure is defined not by the foregoing embodiments but by the following claims. Further, the scope of the present disclosure is intended to include all modifications within the scopes of the claims and within the meanings and scopes of equivalents.

For example, in the above embodiment, the voice recognition processing is performed on an audio signal, the type of the audio signal is determined as the first type in a case in which a voice is recognized by the voice recognition processing, and the type of the audio signal is determined as the second type in a case in which a voice is unable to be recognized by the voice recognition processing. However, the audio signal may include a plurality of channels and may include addition information (metadata) indicating the first type or the second type for each channel. For example, in a case in which the information processing terminal 13 receives a selection operation of "cheer," "clap," "call," "babble," or the like from a listener and generates a corresponding audio signal, the information processing terminal 13 generates an audio signal of a channel corresponding to a selected sound, attaches addition information, and sends the audio signal to the mixer 11. In such a case, the determining portion 302 of the mixer 11 determines the type of the audio signal based on the addition information, for each channel.

In addition, the audio signal may include a sound source of both of the first type and the second type. In such a case, the mixer 11 (or the information processing terminal 13) performs sound source separation on the audio signal of the first type and the audio signal of the second type. The localization processing portion 304 and the distributed processing portion 305 generate a first audio signal and a second audio signal from each separated audio signal. The method of the sound source separation may be any method. For example, as described above, the first type is a speech sound of a specific listener. Therefore, the determining portion 302 can separates the audio signal of the first type by using noise reduction that reduces another sound as a noise sound while using the speech sound as a target sound.

The invention claimed is:

1. An audio signal processing method comprising:
obtaining a plurality of audio signals;
determining a type of each audio signal of the plurality of audio signals;
setting positions of a plurality of virtual speakers;
generating, in a case where an audio signal among the plurality of audio signals is determined to be a first type, a first audio signal by performing localization processing on the audio signal determined to be the first type to localize an acoustic image of the first audio signal at a position of any one virtual speaker of the plurality of virtual speakers;
generating, in a case where an audio signal among the plurality of audio signals is determined to be a second type, a second audio signal by performing distributed processing on the audio signal determined to be the second type to distribute and localize an acoustic image of the second audio signal at positions of two or more virtual speakers of the plurality of virtual speakers;
generating an addition signal by adding the first audio signal and the second audio signal; and
outputting the addition signal to a plurality of real speakers.

2. The audio signal processing method according to claim 1, wherein:
each audio signal of the plurality of audio signals includes a channel; and
the type of each audio signal of the plurality of audio signals is determined for each channel.

3. The audio signal processing method according to claim 1, further comprising:
performing sound source separation on the plurality of audio signals to obtain the audio signal determined to be the first type and the audio signal determined to be the second type, in a case where the plurality of audio signals includes a sound source of both of the first type and the second type.

4. The audio signal processing method according to claim 1, further comprising:
performing voice recognition processing on the plurality of audio signals,
wherein the audio signal determined to be the first type is determined to be the first type in a case where a voice in the audio signal determined to be the first type is recognized by the voice recognition processing; and
wherein the audio signal determined to be the second type is determined to be the second type in a case where a voice in the audio signal determined to be the second type is unable to be recognized by the voice recognition processing.

5. The audio signal processing method according to claim 1, further comprising generating, in a case where another audio signal among the plurality of audio signals is determined to be the first type, a third audio signal by performing localization processing on the another audio signal determined to be the first type to localize an acoustic image of the third audio signal,
wherein in a case where the localization processing performed on the another audio signal determined to be the first type localizes the acoustic image of the third audio signal at a position corresponding to a position of a certain real speaker among the plurality of real speakers, the third audio signal is output to only the certain real speaker.

6. The audio signal processing method according to claim 1, further comprising receiving position information from a user, wherein the localization processing localizes the acoustic image of the first audio signal at a position of the received position information.

7. The audio signal processing method according to claim 1, wherein the localization processing localizes the acoustic image of the first audio signal at the position of the any one virtual speaker of the plurality of virtual speakers by performing panning processing and effect processing.

8. The audio signal processing method according to claim 7, further comprising:
receiving designation information on a seat position from a user; and
changing a content of the panning processing and the effect processing based on the received designation information on the seat position.

9. The audio signal processing method according to claim 7, wherein the effect processing includes processing to add delay, processing to add frequency characteristics, or processing to add reverb.

10. The audio signal processing method according to claim 1, wherein the distributed processing includes an adjustment of an output timing of the second audio signal.

11. An audio signal processing apparatus comprising:
a first communication interface;
a second communication interface; and
a signal processor configured to:
obtain, via the first communication interface, a plurality of audio signals;
determine a type of each audio signal of the plurality of audio signals;
set positions of a plurality of virtual speakers;
generate, in a case where an audio signal among the plurality of audio signals is determined to be a first type, a first audio signal by performing localization processing on the audio signal determined to be the first type to localize an acoustic image of the first audio signal at a position of any one virtual speaker of the plurality of virtual speakers;
generate, in a case where an audio signal among the plurality of audio signals is determined to be a second type, a second audio signal by performing distributed processing on the audio signal determined to be the second type to distribute and localize an acoustic image of the second audio signal at positions of two or more virtual speakers of the plurality of virtual speakers;
generate an addition signal by adding the first audio signal and the second audio signal; and
output, via the second communication interface, the addition signal to a plurality of real speakers.

12. The audio signal processing apparatus according to claim 11, wherein:
each audio signal of the plurality of audio signals includes a channel; and
the type of each audio signal of the plurality of audio signals is determined for each channel.

13. The audio signal processing apparatus according to claim 11, wherein the signal processor is further configured to perform sound source separation on the plurality of audio signals to obtain the audio signal determined to be the first type and the audio signal determined to be the second type, in a case where the plurality of audio signals includes a sound source of both of the first type and the second type.

14. The audio signal processing apparatus according to claim 11, further comprising a voice recognition processing portion that performs voice recognition processing on the plurality of audio signals, wherein:

the audio signal determined to be the first type is determined to be the first type in a case where a voice in the audio signal determined to be the first type is recognized by the voice recognition processing, and the audio signal determined to be the second type is determined to be the second type in a case where a voice in the audio signal determined to be the second type is unable to be recognized by the voice recognition processing.

15. The audio signal processing apparatus according to claim 11, wherein the signal processor is further configured to generate, in a case where another audio signal among the plurality of audio signals is determined to be the first type, a third audio signal by performing localization processing on the another audio signal determined to be the first type to localize an acoustic image of the third audio signal,
wherein in a case where the localization processing performed on the another audio signal determined to be the first type localizes the acoustic image of the third audio signal at a position corresponding to a position of a certain real speaker among the plurality of real speakers, the third audio signal is output, via the second communication interface, to only the certain real speaker.

16. The audio signal processing apparatus according to claim 11, wherein the signal processor is further configured to receive position information from a user, wherein the localization processing localizes the acoustic image of the first audio signal at a position of the received position information.

17. The audio signal processing apparatus according to claim 11, wherein the localization processing localizes the acoustic image of the first audio signal at the position of the any one virtual speaker of the plurality of virtual speakers by performing panning processing and effect processing.

18. The audio signal processing apparatus according to claim 17, wherein the signal processor is further configured to receive designation information on a seat position from a user and to change a content of the panning processing and the effect processing based on the received designation information on the seat position.

19. The audio signal processing apparatus according to claim 17, wherein the effect processing includes processing to add delay, processing to add frequency characteristics, or processing to add reverb.

20. The audio signal processing apparatus according to claim 11, wherein the distributed processing includes an adjustment of an output timing of the second audio signal.

* * * * *